United States Patent [19]

Haskett

[11] Patent Number: 4,845,853

[45] Date of Patent: Jul. 11, 1989

[54] SUNDIAL

[76] Inventor: Carl E. Haskett, 17 Wilana St., Tyler, Tex. 75703

[21] Appl. No.: 239,223

[22] Filed: Sep. 1, 1988

Related U.S. Application Data

[63] Continuation-in-part of Ser. No. 64,532, Jun. 22, 1987, Pat. No. 4,785,542.

[51] Int. Cl.⁴ ............................................ G01C 12/34

[52] U.S. Cl. .................................................. 331/270

[58] Field of Search .......................... 33/269, 270, 271

[56] References Cited

U.S. PATENT DOCUMENTS 303,118 8/1984 Christian ............................. 33/270

4,102,054 7/1978 Lewis .................................. 33/270

4,355,470 10/1980 Doyle .................................. 33/270

*Primary Examiner*—Harry N. Haroian

*Attorney, Agent, or Firm*—John M. Harrison

[57] ABSTRACT

A sundial which is characterized by a selectively portable or permanent base and support bracket combination, which support bracket facilitates an angular movement for effecting latitude adjustment to the sun's path and includes a support bracket plate, a middle plate pivotally connected to the support bracket plate and a connecting plate pivotally attached to the middle plate, with a pair of semi-cylindrical dials secured to the connecting plate in oppositely-disposed relationship. Analemma adjustment for coordinating sundial time with "clock" time is facilitated by an adjustment lever which is pivotally attached to the connecting plate and the middle plate and is adjusted with respect to an analemma path inscribed on the connecting plate. Daylight savings time adjustment is also facilitated by pivoting the middle plate with respect to the support bracket plate and this adjustment also allows correction for location of the sundial within the time zone. A pair of gnomons are suspended outwardly of the concave dial curvatures, respectively, for casting a shadow on the dials and indicating the time of day and day of the year responsive to rotation of the earth and transversal of the shadow across the dials. Each gnomon is spherical in shape and is suspended in the center of a diameter of each of the dials and the connecting plate and dials are oriented at a selected angle with respect to the base, which angle is determined by the latitude at which the sundial is positioned. Each of the dials is further provided with hour and month markings to facilitate direct reading of the time of day and the approximate day of the month responsive to the sequential casting of the shadow by the gnomons.

25 Claims, 3 Drawing Sheets

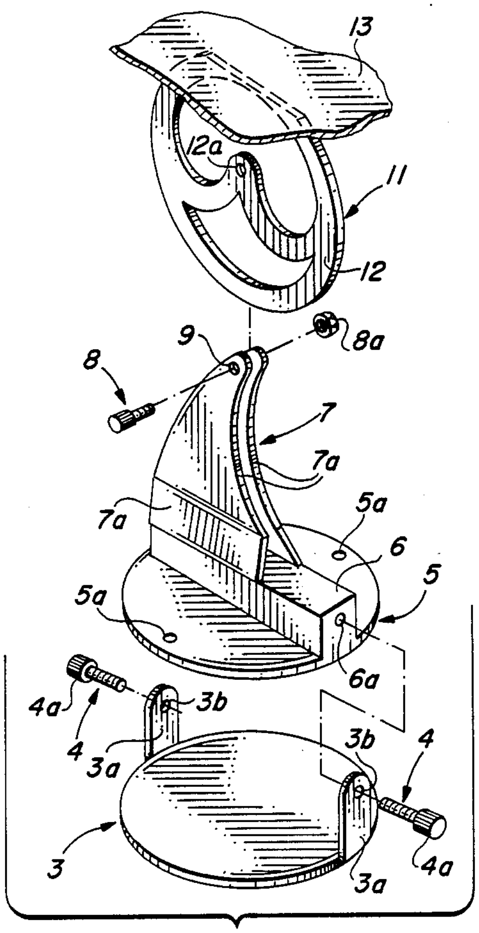
FIG. 3
FIG. 4
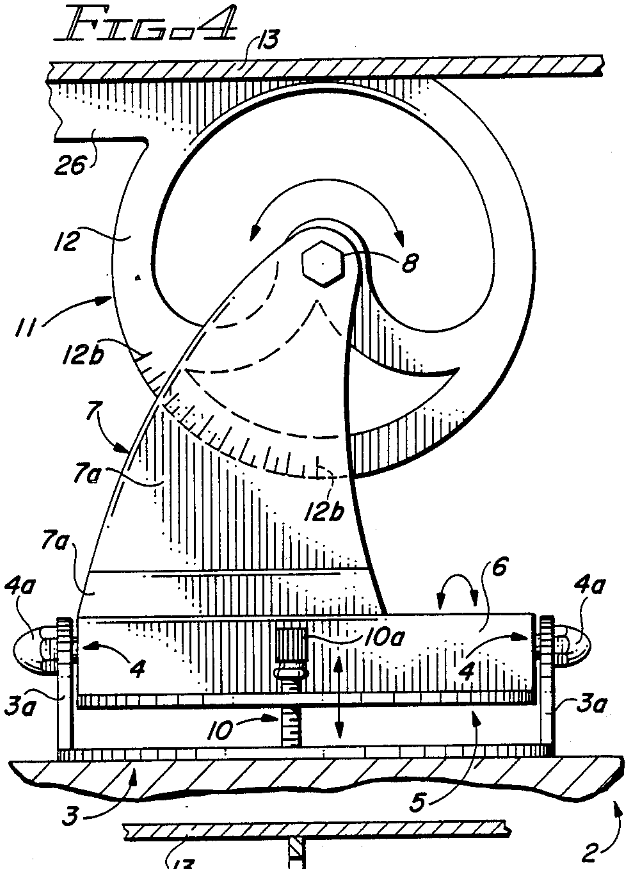
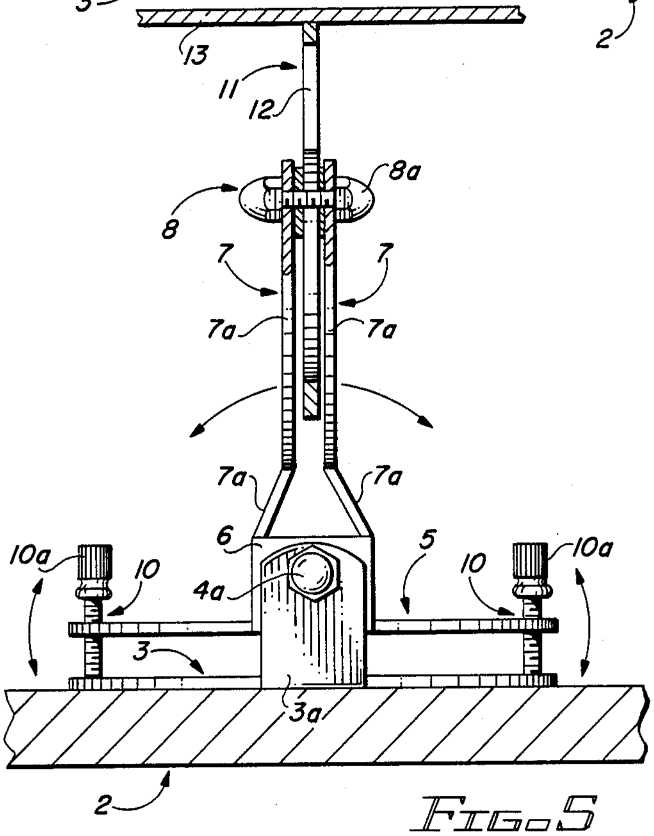
FIG. 5
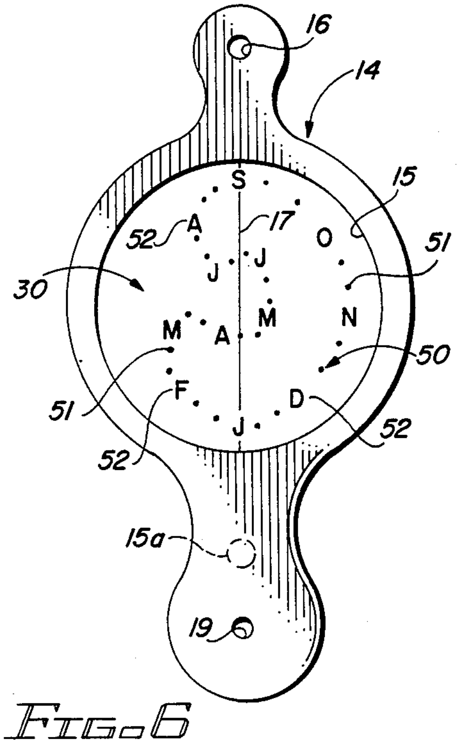
FIG. 6

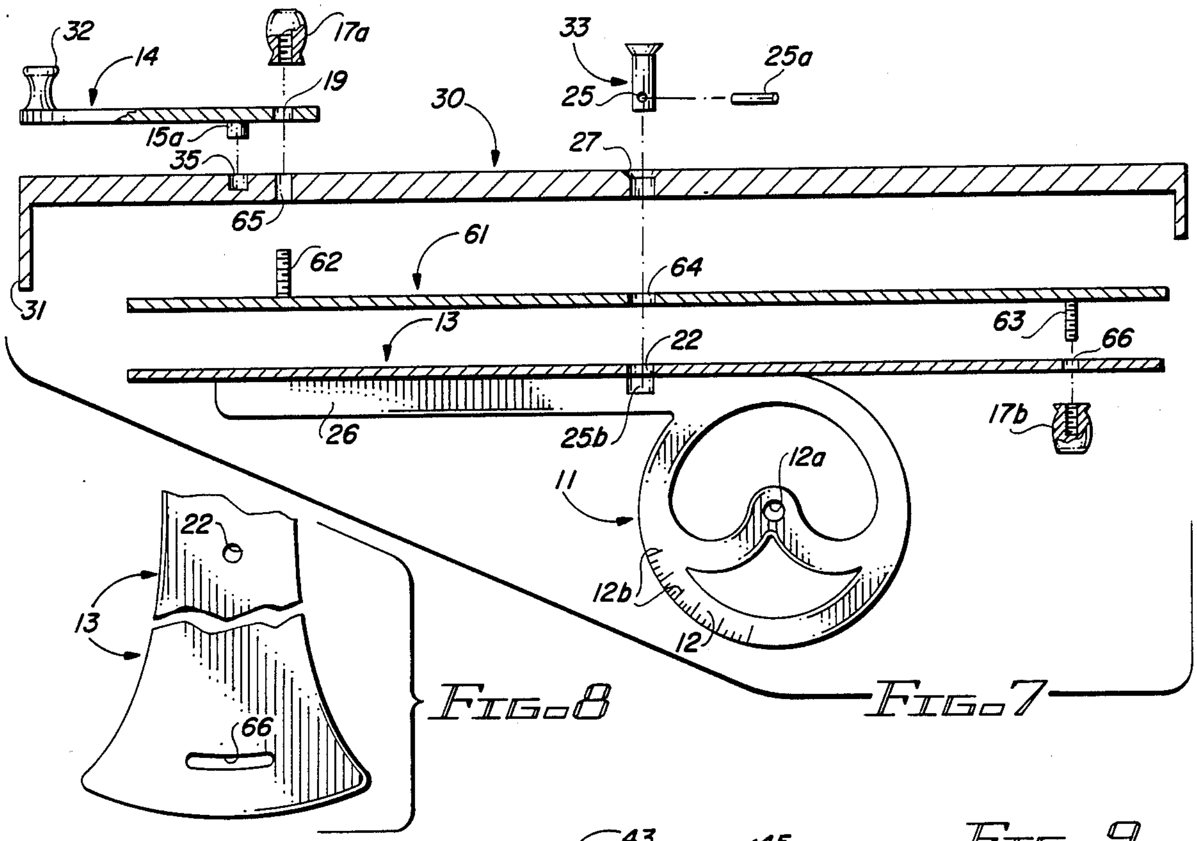
FIG. 8
FIG. 7
FIG. 9
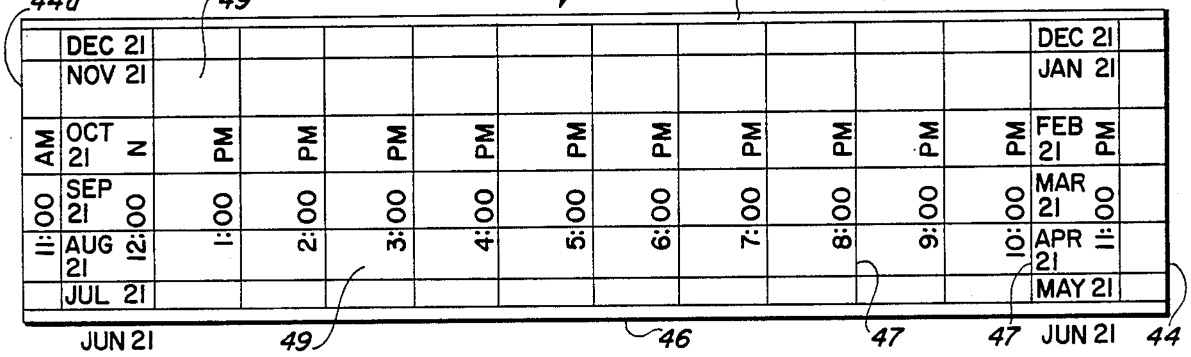
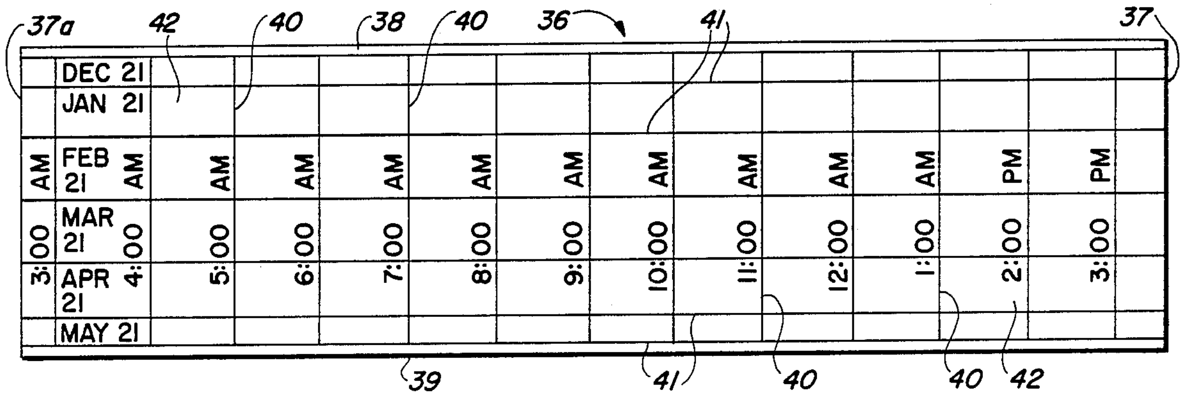
FIG. 10

SUNDIAL

BACKGROUND OF THE INVENTION

CROSS-REFERENCE TO RELATED APPLICATIONS

This application is a Continuation-In-Part of my copending U.S. Pat. No. application Ser. No. 07/064,532, filed Jun. 22, 1987, now U.S. Pat. No. 4,785,542.

FIELD OF THE INVENTION

This invention relates to sundials and more particularly, to a sundial which is capable of indicating both the time of day and the approximate day of the month responsive to the casting of a shadow by spherical gnomons on a pair of semi-cylindrical dials positioned at a selected angle with respect to the axis of the earth. Ideally, the sundial is fitted with a pair of dials which are angularly and pivotally-disposed with respect to the base, in order to effect traversal of the sun's shadow along multiple planes on the concave surface of the dials.

The basic problem with conventional sundials is that they do not indicate clock time, since these devices use a solid gnomon which typically casts a shadow on a flat plate located on or positioned parallel to the surface of the earth. This mechanical arrangement is useless as a time indicator in the early and late portion of the day, because due to the length of the shadow cast, the shadow is barely readable in the middle of the day. Furthermore, these sundials provide no correction for the changing position of the sun relative to clock time. A correction for the position of the sun as it relates to clock time is indicated on many globes as an analemma, shown as a "FIG. 8" in the torrid zone on these globes. The analemma indicates the advance or retardation of the sun relative to clock time, as well as the latitudinal position of the sun during the changing seasons. This time dislocation results from the earth following an elliptical, rather than a circular path about the sun, with the sun positioned at a foci of the ellipse. The elliptical path of the earth may be divided into four parts; a first long path which extends from the equinox position to the farthest apogee, or the summer solstice; a second long path which extends from the farthest apogee back to the opposite equinox position; a first short path which extends from the sun to the near apogee, or the winter solstice; and a second short path from the near apogee back to the starting equinox position. During the first long path, the earth rotates such that with each passing day, it must rotate a fractional degree greater than 360 degrees, in order to bring the same point on earth in line with the sun. Accordingly, the sun "falls behind" relative to the clock. This lag accumulates and reaches a maximum with the solstice, at which point the earth returns along the second long path. However, when the earth reaches this point in its path around the sun, the rotation of the earth is such that a fractional rotation less than 360 degrees is required to place the same point in line with the sun and the sun begins to advance with respect to local, or clock time. This phenomenon is repeated in the two short paths, respectively, and the effect of this phenomenon is to create four different regimes with respect to the advance and retardation of the sun relative to our clock. Close examination of the analemma on a globe reveals that the FIG. 8 is asymmetrical in each of its four parts. Thus, the difficulty in dealing with a sundial correction for this effect has heretofore prevented the construction of a sundial which indicates the correct time regardless of the date.

Another difficulty with conventional sundials is inapplicability of these devices to any but the middle latitudes of the earth. When one considers, for example, that the sun may rise as early as 4:30 a.m. in Boston, Mass., it is understood that state-of-the-art sundials are not suited to the indication of time at such hours, nor are they designed to operate at the late settings of the sun which occur at high latitudes. It was desired to create in the current invention a sundial which will register the correct time regardless of the season or day of the year and regardless of the latitude of the sundial position or the position of the sundial within the time zone.

The sundial of this invention consists of two semi-cylinders, or dials, 180 degrees each in angular length and 47 degrees in angular width, as measured from the midpoint of the center plane or diameter of each dial. This measuring point coincides with the position of the shadow device, or point gnomon, which is itself a small sphere having a diameter sufficiently large to cast a detectable shadow. The dials are oriented such that the plane of the sun's path coincides with the plane of the center of the dials at the two equinoxes and one dial is set facing east and the companion dial facing west, with each dial capable of indicating twelve hours of the sun's passage. The longitudinal axes of the dials are ideally located so as to be parallel with the axis of the earth. Accordingly, when the sundial is located at a point on the equator, the longitudinal axes of the dials are parallel to the earth's surface and when the sundial is located at the poles, the longitudinal axis is perpendicular to the earth's surface. In general, the angle of the longitudinal axis of the dials with respect to the earth's surface is equal to the angle of the latitude of placement.

When the sundial of this invention is so oriented, the shadow of the sun at the spring equinox will trace a pattern along the half-circumference, or the length of the dials exactly in the center of the dials. As summer approaches, the shadow will fall to a plane along the lower segment of the half-circumference of the dials as the sun rises higher from the horizon, until the summer solstice occurs on June 21, to a maximum angular displacement from the center circumferential plane of the dials of slightly more than 23 degrees. The sun will then trace consecutive essentially, parallel paths across the concave dial surfaces back toward the center circumferential plane of the dials until the fall equinox, at which time the daily shadow traces will rise on the dials with the sun lowering on the horizon. This continues until the winter solstice, which occurs on December 21, for a maximum deviation of slightly more than 23 degrees from the center circumferential plane of the dials. With appropriate markings located on the dials, whether these markings are characterized by straight lines extending around the circumference of the dials or by more fanciful markings, one can closely estimate the day of the year from the shadow trace of the gnomons, depending upon the scale of the sundial and presuming the ability to detect the difference between the seasons.

A 24-hour day is based on the apparent passage of the sun through 24 angular periods of 15 degrees, each for a total of 360 degrees, or one complete rotation of the earth on its axis. The semi-cylinders, or dials in the sundial of this invention are thus marked with lines in a transverse direction to the circumferential markings for the day of the year, each 15 angular degrees apart for each hour. The shadow cast by the point gnomon on each dial is therefore capable of indicating twelve hours of time and with two dials opposing each other, all 24 hours of the clock can be indicated by the sundial. However, since the entire 24 hours of the clock are useful only to an inhabitant of the north or south poles for a short period of time each year, then for practical purposes, the sundial of this invention can be made responsive to the sun for a shorter period of time, for example, between the hours of 3:00 a.m. and 11:00 p.m. However, it will be appreciated that a selected scaling of the dials to cover a desired period of time can be effected, according to the desires of the designer.

Since the sundial of this invention is capable of indicating approximately correct time, regardless of the latitude of placement, throughout a full 24-hour day if desired, an adjustment for correcting the analemma, or the advance or retardation of the sun relative to clock time can be implemented to increase accuracy. With the dials correctly oriented, they may be attached to a rigid or portable framework which is mounted or positioned on an axis that exactly parallels the axis of the earth. This mounting is designed to facilitate rotation of the dials through an angle of approximately four degrees each way, or eight degrees total, to compensate for the approximate plus or minus sixteen clock minutes by which the sun is ahead of or behind the clock.

DESCRIPTION OF THE PRIOR ART

Various types of sundials are known to those skilled in the art. U.S. Pat. No. 4,355,470, dated October 26, 1982, to Timothy E. Doyle, details an "Equatorial Sundial". The sundial of this invention includes a dial surface and an elongated, rod-like gnomon fixedly secured in operative relationship thereto. The dial surface is generally semi-cylindrical and concave toward the sun and the circumferential portion of the surface is formed in the shape of a partial helix. The gnomon lies on the axis of the dial surface, such that the longitudinal extent of the surface is transverse of the gnomon at an obtuse angle thereto. In a given geographical location, the sundial is so oriented relative to the earth that the gnomon is parallel to the earth's axis of rotation. With a proper pitch of the helical form of the dial surface, the opposite end portions thereof are offset in a direction parallel to the axis of the gnomon, so that neither shade the dial surface, either in the morning or evening. U.S. Pat. No. 4,135,357, dated Jan. 23, 1979, to George Ashton, entitled "Solar Chronometer", details a sundial which is mounted in alignment with the celestial pole and an equatorial member, preferably in the shape of a ring. The solar chronometer is situated with a style aligned with a celestial pole and an equatorial member aligned with the equator. The style and equatorial member cast shadows upon a chart, such that the point where the shadows intersect indicates the current hour and date. U.S. Pat. No. 4,081,911, entitled "Sundial" was issued on Apr. 4, 1978, to Albert M. Eldridge. The sundial detailed in this patent includes a body portion having a cylindrical wall. A gnomon is connected to the body portion for casting a shadow on the cylindrical wall and a pair of flexible sheets are alternately mountable on the cylindrical wall. Fasteners allow rotation of the sheets about the longitudinal axis of the cylindrical surface to correct for differences between local civil, or clock time and standard time of the time zone of observation. The time lines are configured in accordance with the equation of time and each sheet contains time lines which designate the time occurring in either the fall or spring solstice. A "Sun Compass" is disclosed in U.S. Pat. No. 4,028,813, dated June 14, 1977, to Alfred M. Eldridge. The sun compass includes a base having a transparent hemisphere, a body movable within the base and a plate including a dial face, movable upon the body. Actuating members are connected to the plate and body for selectively moving the plate relative to the body and the body relative to the hemisphere. The actuating members are accessible externally of the hemisphere and include rotatable knobs having scales associated therewith, for indicating the extent of movement of the plate and body. A transparent hemispherical top is mounted over the base hemisphere. U.S. Pat. No. 4,102,054, dated July 25, 1978, entitled "Sundial", to Kemp S. Lewis, discloses a sundial which is adjustable with respect to its mounting location to correct for the earth location in both longitude and latitude. The sundial includes solar time equation indicia and an indicator to correct real solar time to mean solar time and incorporates other indicia to determine the calendar date based on sun declination.

It is an object of this invention to provide a new and improved sundial which is capable of indicating both the time of day and the approximate day of the year.

Another object of the invention is to provide a sundial which is capable of correcting for the advance and retardation of the sun relative to local, or clock time, in order to provide an accurate indication of clock time throughout a 24-hour time span.

Still another object of this invention is to provide a new and improved sundial which is provided with a fixed base and a hingedly-mounted time-indicated portion for accurately indicating the time of day in a time span of up to 24 hours at any latitude of placement and at both equinoxes and solstices.

Yet another object of this invention is to provide a new and improved sundial which can be utilized at any latitude on the earth and is capable of indicating the correct time as closely as one may interpolate the position of the shadow of a point gnomon between the nearest hour or minute marks on a scale.

Yet another object of the invention is to provide a new and improved sundial which is characterized by a fixed base portion, a pair of semicylinders or dials pivotally mounted to an adjustable frame, which frame is hingedly mounted to the base portion, in order to facilitate a pair of curved, time-indicating surfaces which are not distorted by curvature and present an effective surface for reading a shadow cast by spherical point gnomons suspended from the curvature of the dials, respectively.

A still further object of this invention is to provide a new and improved, portable or permanently mounted sundial which is characterized by a base that adjustably mounts a pair of curved, time-indicating dials which are provided with spherical gnomons suspended along a diameter in the center thereof, for sequentially casting a shadow on the dials and accurately indicating the time of day and the approximate day of the year for any time period, including a full 24 hour day.

Yet another object of this invention is to provide a sundial which is characterized by a base element and a time-indicating element adjustably attached to the base element, which time-indicating element further includes a support bracket plate, a middle plate pivotally attached to the support bracket plate and a connecting plate pivotally attached to the middle plate and the support bracket plate for deploying a pair of arcuate dials and companion gnomons toward the sun and indicating the current time.

SUMMARY OF THE INVENTION

These and other objects of the invention are provided in a new and improved sundial which is characterized by a base adapted for selectively fixed or portable attachment to the ground or a stationary object, a base pedestal attached to and extending upwardly from the base; a support bracket plate attached to the support bracket in vertically pivoting, angle adjusting relationship; a middle plate attached to the support plate in limited horizontally pivoting relationship; a connecting plate horizontally pivoted to the middle plate; a pair of semi-cylinders or dials attached to the connecting plate and provided with time markings on the concave inside surfaces thereof; spherical gnomons suspended along a diameter of the dials in the center plane thereof, for sequentially casting a shadow on the dials and indicating local, or clock time, responsive to traversal of the shadow of the gnomons longitudinally across the dial surfaces, respectively; and an analemma adjustment lever pivotally secured to the connecting plate and the middle plate, for adjusting the dials to read "clock" time.

BRIEF DESCRIPTION OF THE DRAWINGS

The invention will be better understood by reference to the accompanying drawings, wherein:

FIG. 3 is an exploded view of the base plate, adjusting plate and support bracket of the sundial illustrated in FIGS. 1 and 2;

FIG. 4 is a side view, partially in section, of the base, base plate, adjusting plate and support bracket illustrated in FIG. 1;

FIG. 5 is a front view, partially in section, of the base, base plate, adjusting plate and support bracket of the sundial illustrated in FIG. 4;

FIG. 6 is a top view of an analemma adjustment lever for adjusting the analemma of the sundial illustrated in FIGS. 1 and 2;

FIG. 7 is an exploded view of the support bracket, middle plate, connecting plate and analemma adjustment lever of the sundial illustrated in FIGS. 1 and 2;

FIG. 8 is a top view, partially in section, of the rear end of a support bracket plate component of the support bracket illustrated in FIG. 7;

FIG. 9 is a front view of the curved face of the east dial of the sundial illustrated in FIGS. 1 and 2; and FIG. 10 is a front view of the support plate face and overlying connecting plate face of the sun dial illustrated in FIGS. 1 and 2.

DESCRIPTION OF THE PREFERRED EMBODIMENTS

Figure 1:
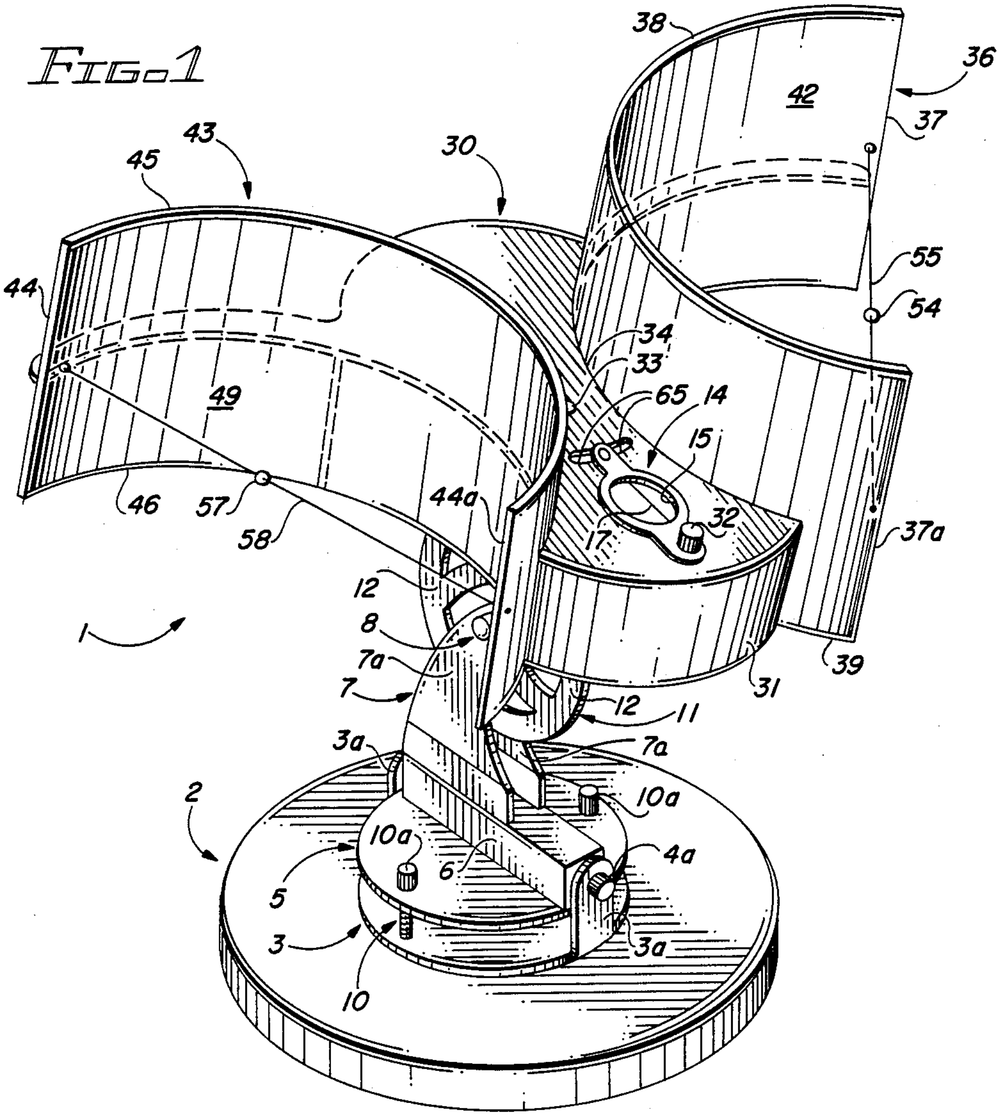
FIG. 1 is a perspective view of a preferred embodiment of the sundial of this invention.
Figure 2:
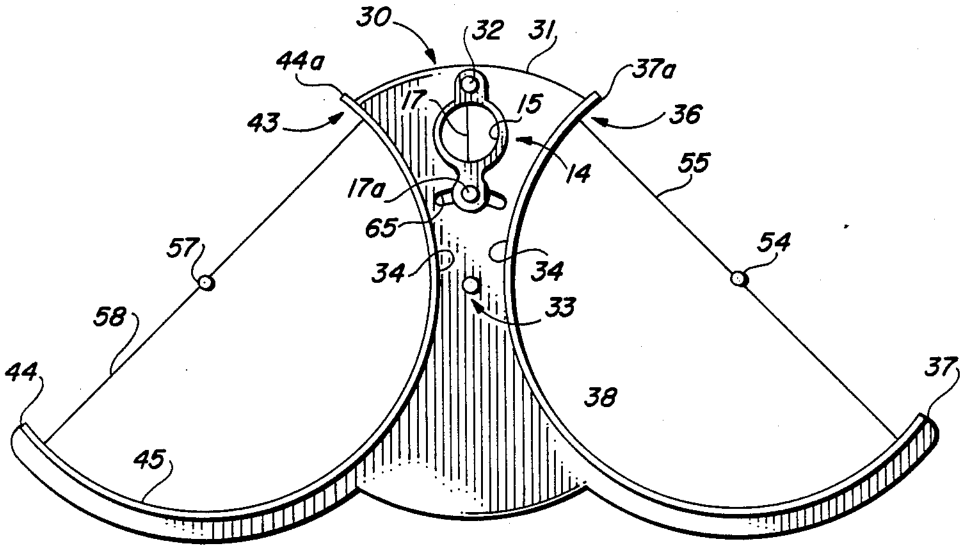
FIG. 2 is a top view of the sundial illustrated in FIG. 1.

Referring initially to FIGS. 1, 3, 4 and 5 of the drawings, the sundial of this invention is generally illustrated in a portable embodiment by reference numeral 1. The sundial 1 is characterized by a round base 2, fitted with a flat base plate 3 having oppositely-disposed, upward-standing plate flanges 3*a*, which are provided with plate flange apertures 3*b*, respectively, as illustrated in FIG. 3. A round adjusting plate 5 is disposed above the base plate 3 in spaced relationship and is fitted with an upward-standing mounting block 6, provided with block apertures 6*a*, in the ends thereof, as further illustrated in FIG. 3. A base pedestal 7 is characterized by a pair of parallel pedestal plates 7*a* which are upward-standing from the mounting block 6 in spaced, parallel, relationship and are each fitted with a pedestal plate aperture 9 in registering relationship at the top thereof, also as illustrated in FIG. 3. The adjusting plate 5 is pivotally mounted in spaced, substantially parallel relationship with respect to the base plate 3 by extending a pair of pivot bolts 4 through the respective plate flange apertures 3*b* in the upward-standing plate flanges 3*a* and threadably engaging a pair of oppositely-disposed, threaded block apertures 6*a* provided in the ends of the mounting block 6, as further illustrated in FIGS. 1, 3, 4 and 5. A pair of threaded plate apertures 5*a* are also provided in oppositely-disposed relationship in the adjusting plate 5 and a pair of adjusting pins 10 extend through the plate apertures 5*a*, respectively, in threadible relationship and contact the base plate 3 as illustrated in FIGS. 1, 4 and 5. The adjusting pins 10 facilitate pivotal adjustment of the adjusting plate 5 and the base pedestal 7 by threadibly manipulating the knurled heads 10*a* of the adjusting pins 10, as hereinafter further described. As further illustrated in FIGS. 1 and 3–5, a support bracket, generally illustrated by reference numeral 11, is characterized by a round hinged plate 12 having a plate aperture 12*a* in the center thereof, for rotatably mounting the support bracket 11 to the pedestal plate 7*a* and the base pedestal 7. Spaced latitude marks 12*b* are inscribed or otherwise provided on a segment of the hinge plate 12, for alignment with the front edge of the pedestal plates 7*a* and determining the proper angular displacement of the support bracket 11 with respect to the base pedestal 7 which corresponds to the latitudinal location of the sundial 1, as hereinafter further described. A pedestal pin 8, provided with a pin nut 8*a*, extends through the registering pedestal plate apertures 9 in the pedestal plates 7*a* and through the plate aperture 12*a* in the hinge plate 12 to rotatably mount the support bracket 11 on the base pedestal 7, as illustrated in FIG. 4. A flat support bracket plate 13 is mounted in fixed, horizontal disposition on the hinge plate 12, as further illustrated in FIG. 4 and a support bracket flange 26 extends downwardly from the hinge plate 12 and is fixedly attached to the support bracket plate 13, in order to stiffen and secure the support bracket plate 13 on the hinge plate 12 in fixed relationship.

Referring now to FIGS. 1 and 7 of the drawings, a connecting pin seat 22 is provided substantially in the center of the support bracket plate 13 and a support plate pin slot 66 is provided in the rear segment of the support bracket plate 13, as further illustrated in FIG. 7. A middle plate 61 is provided with a middle plate aperture 64, designed to register with the connecting pin seat 22 in the support bracket plate 13 and is further provided with a downwardly-extending bottom middle plate pin 63, provided in registration with the support plate pin slot 66 and an upwardly-extending top middle plate pin 62, extending from the front portion of the middle plate 61, as further illustrated in FIG. 7. A connecting plate 30 extends parallel to the middle plate 61 and the support bracket plate 13 and is provided with a connecting plate pin slot 65 located in registration with and adapted to receive the top middle plate pin 62, projecting upwardly from the middle plate 61. The connecting plate 30 further includes a plate-connecting pin aperture 27 which is provided in registration with the middle plate aperture 64 and the connecting pin seat 22 and a plate connecting pin 33 is inserted through the plate connecting pin aperture 27, the middle plate aperture 64 and the connecting pin seat 22, in order to rotatably mount the connecting plate 30 to the middle plate 61 and the middle plate 61 to the support bracket plate 13, as illustrated in FIGS. 1 and 7. A stay slot 25*b* is provided in the support bracket flange 26, in order to receive a pin stay 25*a*, which registers with the pin opening 25 located in the plate connecting pin 33, in order to secure the plate connecting pin 33 in position in the plate connecting pin aperture 27, middle plate aperture 64 and the connecting pin seat 22, respectively. Accordingly, it will be appreciated from a consideration of FIGS. 1, 7 and 8 of the drawings, that the connecting plate 30 is pivotable on the plate connecting pin 33 with respect to both the middle plates 61 and the support bracket plate 13, while the middle plate 61 is also pivotable with respect to the support bracket plate 13, for purposes which will be hereinafter further described. A bottom mount nut 17*b* is adapted for threadible attachment to the downwardly-extending bottom middle plate pin 63, in order to secure the middle plate 61 in a selected orientation with respect to the support bracket plate 13, as the bottom middle plate pin 63 traverses the support plate pin slot 66, as hereinafter further described. An analemma adjustment lever 14 is pivotally secured to the connecting plate 30 by means of a downwardly-extending lever pin 15*a*, which registers with a lever pin seat 35 provided in the connecting plate 30. The top middle plate pin 62 projects upwardly from fixed attachment to the middle plate 61 through the connecting plate pin slot 65, illustrated in FIGS. 1 and 7 and also projects through a lever aperture 19, provided in the rear portion of the analemma adjustment lever 14, as illustrated in FIG. 7. A top mount nut 17*a* threadibly engages the top middle plate pin 62 to secure the analemma adjustment lever 14 in position on the connecting plate 30, as illustrated in FIGS. 1 and 7.

Referring now to FIGS. 1, 2, 6 and 7 of the drawings the analemma adjustment lever 14 is provided with a round lever opening 15, having a hairline or curser 17 extending in longitudinal fashion across a diameter thereof, with the curser 17 located above a kidney-shaped analemma path 50, which is inscribed on the underlying surface of the connecting plate 30, as illustrated in FIG. 6. The analemma path 50 includes spaced path locations 51 which are defined by month designations 52 and the curser 17 can be adjusted to align with selected ones of the path locations 51 and the month designations 52, by pivotally adjusting the analemma adjustment lever 14 with respect to the analemma path 50, as hereinafter further described. In order to expedite this adjustment, a knob mount opening 16 is provided in the front end of the analemma adjustment lever 14 to accommodate an adjusting knob 32.

Referring now to FIGS. 1, 2, 8 and 9 of the drawings, a curved east dial 36 is secured to one of the curved connecting plate margins 34 provided in the collecting plate 30, while an oppositely-curved west dial 43 is secured to the oppositely-curved connecting plate margin 34. The east dial 36 and the west dial 43 are each characterized by oppositely-disposed, semi-cylindrical members having concave surfaces facing away from each other and rigidly attached to the connecting plate 30 at the connecting plate margins 34 by welding, brazing, glue, screws or other fasteners, as desired. Since the connecting plate 30 is pivotally secured to the underlying middle plate 61 and support bracket plate 13 by means of the plate connecting pin 33, pivoting of the connecting plate 30 with respect to the fixed support bracket plate 13 by grasping the adjusting knob 32, also pivots and angularly displaces the east dial 36 and the west dial 43 in concert with respect to the middle plate 61. The east dial 36 and the west dial 43 are further characterized by a smooth, concave east dial face 42 and west dial face 49, respectively, and the east dial 36 is terminated on the front end by an east dial front edge 37*a* and at the opposite rear end by an east dial rear edge 37. Similarly, the west dial 43 is terminated at the front end by a west dial front edge 44*a* and at the opposite end by a west dial rear edge 44. The east dial 36 is further defined by an east dial top edge 38 and a parallel east dial bottom edge 39, while the west dial 43 is characterized by a west dial top edge 45 and a parallel west dial bottom edge 46, respectively. A flexible, elongated east dial gnomon support 55 extends from a first gnomon mount opening 59, located near the midpoint of the east dial rear edge 37, to a second gnomon mount opening 59, to a second gnomon mount opening 59 positioned near the east dial front edge 37*a* and supports a spherical east dial gnomon 54 in the center thereof. Similarly, a west dial gnomon support 58 projects between a third gnomon mount opening 59, located near the center of the west dial rear edge 44 and a companion gnomon mount opening 59, positioned near the west dial front edge 44*a* and supports a spherical west dial gnomon 57 in the center thereof. In a most preferred embodiment of the invention, the east dial gnomon support 55 is a thread, wire or string which defines a diameter of the east dial 36 and the east dial gnomon 54 is anchored at a center point on the east dial gnomon support 55 which is equidistant between the east dial rear edge 37 and the east dial front edge 37*a*. Accordingly, the east dial gnomon 54 is suspended at the center of a circle defined by completion of the curvature of the east dial 36 and the east dial gnomon support 55 may be supported near the east dial rear edge 37 and east dial front edge 37*a* in the gnomon mount openings 59 by means of support knots 56, which are knotted in each end of the east dial gnomon support 55. Similarly, the west dial gnomon support 58 defines a diameter of the west dial 43 and is located at the midpoint of the distance between the ends of the west dial rear edge 44 and the west dial front edge 44*a*, with the west dial gnomon 57 located at the center of a circle defined by extension of the west dial 43 curvature. As in the case of the east dial gnomon support 55, the west dial gnomon support 58 is preferably attached to the west dial 43 near the west dial rear edge 44 and the west dial front edge 44*a* in the gnomon mount openings 59, by means of support knots 56, provided in the ends of the west dial gnomon support 58. Alternatively, suitable stays or anchors (not illustrated) may be secured anywhere on the connecting plate 30, so as to retain the east dial gnomon 54 and the west dial gnomon 57 in proper position opposite the centers of the east dial space 42 and west dial face 49, respectively, according to the knowledge of those skilled in the art.

Referring now to FIG. 9 of the drawings, in a most preferred embodiment of the invention the concave east dial face 42 of the east dial 36 is provided with east dial time marks 40, which are vertically described thereon in spaced relationship and east dial month marks 41, which are horizontally described in spaced relationship thereon. Similarly, the west dial face 49 of the west dial 43 is provided with vertically oriented, spaced west dial time marks 47 and horizontally spaced west dial month marks 48, as illustrated. The east dial time marks 40 and the west dial time marks 47 are selectively spaced to facilitate indication of the time required for the shadow created by the east dial gnomon 54 and the west dial gnomon 57 and the sun, to move in sequence from the east dial rear edge 37 to the east dial front edge 37*a* and from the west dial front edge 44*a* to the west dial rear edge 44, respectively. The selection of this spacing is arbitrary, depending upon whether a full 24-hour time span indicates this desire or whether the time span is to be condensed, for example, to include the time interval of from about 2:00 a.m. to about 10:00 p.m., which is a time span that extends from sunup to sundown in most latitudes other than location of the sundial 1 at the two poles, as further hereinafter described.

Referring again to the drawings, the sundial 1 of this invention is prepared for use as follows. During a middle hour of the day around noon, the sundial 1 is positioned with the connecting plate face 31 facing South, the base 2 located on a stable surface and the adjusting pins 10 are threadibly manipulated to approximately level the sundial 1. The support bracket 11, middle plate 61, connecting plate 30, east dial 36 and west dial 43 are then raised in concert toward the sun by operation of the pedestal hinge 8 to or near the appropriate latitude mark 12*b*, until a shadow generated by the east dial gnomon 54 indicates the approximately current day of the year relative to the east dial month marks 41, located on the curved east dial face 42. The sundial 1 is then further adjusted using the adjusting pins 10, until the shadows cast on the east dial face 42 and the west dial face 49 by the east dial gnomon 54 and the west dial gnomon 57, respectively, indicate the same day, and maintain this indication as the sundial 1 is rotated on its vertical axis about the pivot bolt 33. The analemma adjustment lever 14 is then rotated relative to the connecting plate 30 to align the curser 17, located on the analemma adjustment lever 14, with the current month designation 52, noted on the connecting plate 30 to compensate for that day's advance or retardation of the sun relative to clock time. The sundial 1 is then again rotated on its base 2 about the pivot bolt 33 until the correct time of day is indicated by the shadow generated by the east dial gnomon 54 and the west dial gnomon 57, at or near the midday period, taking into consideration the time dislocation resulting from the specific location of the sundial 1 in the time zone. The adjusting pins 10 are again threadibly manipulated in the adjusting plate 5 until the correct day is indicated on both the east dial face 42 of the east dial 36 and the west dial face 49 of the west dial 43 and the time of day is confirmed once again with regard to the east dial time marks 40 and the west dial time marks 47, respectively. The sundial 1 is then clamped or the base 2 otherwise firmly secured in place to prevent any further movement of the sundial 1 and the dials are rotated about the pivot bolt 33 to indicate the correct time of day. This completes the correct orientation of the dials.

It will be appreciated by those skilled in the art that the sundial of this invention is capable of indicating accurate clock time regardless of the latitude at which it is placed. However, it is understood that the east dial time marks 40 and east dial month marks 41, located on the east dial face 42 and the west dial time marks 47, along with the west dial month marks 48, located on the west dial face 49, must be relocated if the sundial 1 is to be used in any location south of the equator. This change is not necessary if the connecting plate 30, the middle plate 61 and the support bracket plate 25 are mounted to position the east dial 36 and the west dial 43 in a 180-degree orientation with respect to the base 2, in order to facilitate angular adjustment of the east dial 36 and the west dial 43 at an angle from 0 degrees at the equator, to 90 degrees at either one of the poles.

It will be further appreciated by those skilled in the art that the sundial of this invention is capable of being adjusted such that it will read and indicate standard time, as well as daylight savings time as a function of local clock time. Such an alteration includes loosening the bottom mount nut 17*b* to accommodate rotation of the middle plate 61 with respect to the support bracket plate 13, such that a relative rotation of about 15 degrees is facilitated, to accomplish the daylight savings time change. This rotational adjustment is then clamped into position by operation of the bottom mount nut 17*b*, with the connecting plate 30 remaining rotatable with respect to the middle plate 61, in order to compensate for the lag or advance of the sun relative to the earth, as heretofore described. Since the east dial time marks 40 and west dial time marks 47 of the east dial 36 and the west dial 43 are marked for daylight savings time, movement of the middle plate 61 through an arc of 15 degrees in the clockwise direction as the bottom middle plate pin 63 traverses the support plate pin slot 66, facilitates adjustment of the sundial 1 to standard time. Additional adjustment in this manner can be effected to compensate for the specific position of the sundial 1 within a time zone, when the angular position within the time zone is ascertained.

It will also be appreciated by those skilled in the art that the sundial of this invention can be constructed of a variety of materials, including metal such as brass, stainless steel and like metals, or thermoplastic and thermoresin material of selected density and character and fiberglass, as well as other materials well known to those skilled in the art. Furthermore, while the sundial 1 illustrated in the drawings is portable and adjustable as to latitude by operation of the adjusting pins 10 and the pedestal pin 8, it will be recognized that the sundial 1 can also be permanently mounted on a fixed pedestal, mount or base at a predetermined angle which is proper for a selected latitude and in an accurate East-West position. Such a mounting would eliminate the need for a pedestal pin 8, and adjusting pins 10.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A sundial comprising base means adapted for mounting on a supporting surface; support bracket means carried by said base means in vertical angularly adjustable relationship; a connecting plate pivotally carried by said support bracket means; a pair of curved dial means fixedly attached to said connecting plate, said dial means each having a concave surface facing in oppositely-disposed, fixed relationship with respect to each other for sequentially facing the sun; spaced time marks provided on said concave surface of each of said dial means for marking the passage of time as a function of the length of said concave surface; and a pair of gnomons suspended across a diameter of each of said dial means, respectively, whereby the shadow cast by said gnomons sequentially traverses said concave surface and said time marks of each of said dial means, respectively, substantially in accordance with clock time, responsive to rotation of the earth.

2. The sundial of claim 1 further comprising pivot means provided in said support bracket means and said connecting plate for pivoting said connecting plate and said dial means in concert with respect to said support bracket means; analemma adjustment means pivotally seated on said connecting plate and analemma adjustment indicia provided on said connecting plate, whereby said analemma adjustment means is selectively aligned with said analemma adjustment indicia responsive to pivoting of said analemma adjustment means with respect to said connecting plate.

3. The sundial of claim 1 further comprising a hinge plate carried by said support bracket means, said hinge plate adapted for engaging said base means in said vertical angularly adjustable relationship and vertically adjusting said support bracket means and said connecting plate in a selected angular relationship with respect to the supporting surface.

4. The sundial of claim 1 further comprising:

(a) pivot means provided in said support bracket means and said connecting plate for pivoting said connecting plate and said dial means in concert with respect to said support bracket means; analemma adjustment means pivotally mounted on said connecting plate and analemma adjustment indicia provided on said connecting plate, whereby said analemma adjustment means is selectively aligned with said analemma adjustment indicia responsive to pivoting of said analemma adjustment means with respect to said connecting plate; and (b) a hinge plate carried by said support bracket means, said hinge plate adapted for engaging said base means in said vertical angularly adjustable relationship and vertically adjusting said support bracket means and said connecting plate and said dial means in a selected angular relationship with respect to the supporting surface.

5. The sundial of claim 1 wherein said base means further comprises a base located substantially beneath said support bracket means; a base plate fixedly attached to said base and a pair of plate flanges upward-standing from said base plate in spaced relationship; an adjusting plate pivotally attached to said plate flanges in spaced relationship with respect to said base plate and a base pedestal fixedly attached to said adjusting plate, said base pedestal engaging said support bracket means in hinged relationship, whereby said support bracket means, said connecting plate and said dial means are vertically adjustable in concert to a selected angle with respect to said base pedestal and said base.

6. The sundial of claim 5 further comprising adjusting means provided in said adjusting plate for selectively engaging said base plate and adjusting the horizontal attitude of said support bracket means, said connecting plate and said dial means with respect to said base.

7. The sundial of claim 5 further comprising:

(a) pivot means provided in said support bracket means and said connecting plate for pivoting said connecting plate and said dial means in concert with respect to said support bracket means; analemma adjustment means pivotally mounted on said connecting plate and analemma adjustment indicia provided on said connecting plate, whereby said analemma adjustment means is selectively aligned with said analemma adjustment indicia responsive to pivoting of said analemma adjustment means with respect to said connecting plate; and (b) a hinge plate carried by said support bracket means, said hinge plate adapted for engaging said base pedestal in adjustable relationship and vertically adjusting said support bracket means, said connecting plate and said dial means in a selected angular relationship with respect to said base.

8. The sundial of claim 7 further comprising adjusting means provided in said adjusting plate for selectively engaging said base plate and adjusting the horizontal attitude of said support bracket means, said connecting plate and said dial means with respect to said base.

9. The sundial of claim 1 wherein:

(a) said support bracket means further comprises a hinge plate rotatably carried by said base means; a support bracket plate fixedly attached to said hinge plate; a connecting pin seat provided in said support bracket plate and a support bracket plate pin slot provided in said support bracket plate in spaced relationship with respect to said connecting pin seat; a middle plate pivotally carried by said support bracket plate, an upper plate pin projecting upwardly from said middle plate near one end thereof, a bottom plate pin projecting downwardly from said middle plate near the opposite end thereof, said bottom plate pin extending through said support bracket pin slot in said support bracket plate and a middle plate aperture provided in said middle plate; a connecting plate pin slot provided in said connecting plate for receiving said upper plate pin; a connecting plate aperture provided in said connecting plate in substantial alignment with said middle plate aperture and said connecting pin seat in said support bracket plate; and a plate connecting pin extending through said connecting plate aperture, said middle plate aperture and into said connecting pin seat for mounting said connecting plate in pivotal relationship on said middle plate and mounting said middle plate in pivotal relationship on said support bracket plate; and (b) said dial means further comprises a pair of arcuate, semicircular dials, whereby said connecting plate and said dials are pivotally adjustable in concert with respect to said middle plate.

10. The sundial of claim 9 further comprising an analemma adjustment lever pivotally seated in said connecting plate and pivotally mounted on said upper plate pin and analemma adjustment indicia provided on said connecting plate, whereby said analemma adjustment lever is selectively aligned with said analemma adjustment indicia responsive to pivoting of said analemma adjustment lever on said upper plate pin and said connecting plate.

11. The sundial of claim 9 wherein said base means further comprises a base located substantially beneath said hinge plate; a base plate fixedly attached to said base and a pair of plate flanges upward-standing from said base plate in spaced relationship; an adjusting plate pivotally attached to said plate flanges in spaced relationship with respect to said base plate and a base pedestal fixedly attached to said adjusting plate, said base pedestal engaging said hinge plate in said vertically angularly adjustable relationship, whereby said hinge plate, said support bracket plate, said middle plate, said connecting plate and said arcuate dials are vertically adjustable in concert to a selected vertical angle with respect to said base.

12. The sundial of claim 11 further comprising an analemma adjustment lever pivotally seated in said connecting plate and pivotally mounted on said upper plate pin and analemma adjustment indicia provided on said connecting plate, whereby said analemma adjustment lever is selectively aligned with said analemma adjustment indicia responsive to pivoting of said analemma adjustment lever on said upper plate pin and said connecting plate.

13. The sundial of claim 12 further comprising retaining means provided on said bottom plate pin for securing said middle plate to said support bracket plate after selectively adjusting said middle plate, said connecting plate and said dials to standard time and daylight savings time, respectively.

14. The sundial of claim 13 further comprising adjusting means provided in said adjusting plate for selectively engaging said base plate and adjusting the horizontal attitude of said adjusting plate, said base pedestal, said hinge plate, said support bracket plate, said middle plate, said connecting plate and said dials with respect to said base.

15. The sundial of claim 14 further comprising a lever pin projecting downwardly from said analemma adjustment lever, a lever pin seat provided in said connecting plate for rotatably receiving said lever pin, a lever pivot opening provided in said analemma adjustment lever for receiving said upper plate pin and upper plate pin retaining means attached to said upper plate pin, whereby said connecting plate and said analemma adjustment lever are pivotally adjusted with respect to each other for alignment of said analemma adjustment lever with said analemma adjustment indicia, responsive to manipulation of said analemma adjustment lever.

16. The sundial of claim 15 further comprising a plurality of shadow traverse lines provided on said concave surface of each of said dials, respectively, in longitudinal, spaced relationship, said shadow traverse lines intersecting said time marks for indicating the month of the year.

17. A sundial which substantially indicates clock time, comprising base means adapted for mounting on a supporting surface; adjusting means engaging said base means in hingedly adjustable relationship; a support bracket plate carried by said adjusting means, whereby the vertical angle between said support bracket plate and the supporting surface is selectively altered by manipulation of said support bracket plate with respect to said base means; a middle plate pivotally carried by said support bracket plate in stacked, pivotal relationship; a connecting plate positioned on top of said middle in stacked, pivotal relationship and pivot means connecting said support bracket plate, said middle plate and said connecting plate in selectively pivoting relationship; a first semi-cylindrical dial fixedly attached to said connecting plate, with a first concave surface of said first semi-cylindrical dial facing outwardly of said connecting plate; a second semi-cylindrical dial fixedly attached to said connecting plate in spaced relationship with respect to said first semi-cylindrical dial, with a second concave surface of said second semi-cylindrical dial facing outwardly of said connecting plate in oppositely-disposed relationship with respect to said first concave surface; a first set of spaced time marks provided and identified in sequence on said first concave surface and a second set of spaced time marks provided and identified in sequence on said second concave surface for indicating the passage of time; a first gnomon suspended across a diameter of said first semi-cylindrical dial and a second gnomon suspended across a diameter of said second semi-cylindrical dial, respectively, whereby the shadow cast by said first gnomon and said second gnomon sequentially traverses said first set of spaced time marks and said second set of spaced time marks, respectively, substantially in accordance with clock time responsive to rotation of the earth on its axis.

18. The sundial of claim 17 further comprising an analemma adjustment lever pivotally seated in said connecting plate and pivotally carried by said middle plate and analemma adjustment indicia provided on said connecting plate, whereby said analemma adjustment lever is selectively aligned with said analemma adjustment indicia responsive to pivoting of said analemma adjustment lever with respect to said connecting plate.

19. The sundial of claim 18 wherein said adjusting means further comprises a support bracket flange fixedly attached to said support bracket plate; a hinge plate downwardly-extending from said support bracket flange and a hinge plate aperture provided in said hinge plate; at least one base pedestal plate extending upwardly from said base means for engaging said hinge plate and a pedestal plate aperture provided in said base pedestal plate; and a pedestal pin adapted for insertion in said hinge plate aperture and said pedestal plate aperture for pivotally mounting said hinge plate and said support bracket flange to said base pedestal plate and said base means.

20. The sundial of claim 19 further comprising a lever opening provided in said analemma adjustment lever and a curser projecting across said lever opening, whereby said curser is aligned with selected elements in said analemma indicia responsive to pivotal adjustments of said analemma adjustment lever with respect to said connecting plate.

21. The sundial of claim 20 further comprising:

(a) a connecting pin seat provided in said support bracket plate; a support bracket plate pin slot provided in said support bracket plate in spaced relationship with respect to said connecting pin seat; an upper plate pin projecting upwardly from said middle plate near one end thereof, a bottom plate pin projecting downwardly from said middle plate near the opposite end thereof, said bottom plate pin extending through said support bracket pin slot in said support bracket plate and a middle plate aperture provided in said middle plate; a connecting plate pin slot provided in said connecting plate for receiving said upper plate pin; a connecting plate aperture provided in said connecting plate in substantial alignment with said middle plate aperture and said connecting pin seat in said support bracket plate; and a plate connecting pin extending through said connecting plate aperture, said middle plate aperture and into said connecting pin seat, for mounting said connecting plate in pivotal relationship on said middle plate and mounting said middle plate in pivotal relationship on said support bracket plate.

22. The sundial of claim 21 wherein said base means further comprises a base located substantially beneath said support bracket plate; a base plate fixedly attached to said base and a pair of plate flanges upward-standing from said base plate in spaced relationship; an adjusting plate pivotally attached to said plate flanges in spaced relationship with respect to said base plate and a base pedestal fixedly attached to said adjusting plate, said base pedestal engaging said support bracket means in hinged relationship, whereby said support bracket plate, said middle plate, said connecting plate, said first semi-cylindrical dial and said second semi-cylindrical dial are vertically adjustable in concert to a selected angle with respect to said base.

23. A sundial which substantially indicates clock time comprising base means adapted for mounting on a supporting surface; support bracket means carried by said base means in adjustable angular relationship, said angular relationship substantially corresponding to the latitudinal location of said sundial; connecting plate means carried by said support bracket means in laterally pivoting relationship; analemma adjustment means mounted on said connecting plate means in laterally pivoting relationship and analemma adjustment indicia provided on said connecting plate means, whereby said analemma adjustment means is selectively aligned with said analemma adjustment indicia responsive to pivoting of said analemma adjustment lever with respect to said connecting plate means; a pair of curved dials carried by said connecting plate means, said dials each having a concave surface facing in oppositely-disposed, fixed relationship with respect to each other for sequentially facing the sun; spaced time marks provided on said concave surface for marking the passage of time; and a pair of gnomons suspended across a diameter of said dials, respectively, whereby the shadow cast by said gnomons sequentially traverses said concave surface and said time marks of each of said dial means, respectively, substantially in accordance with clock time, responsive to rotation of the earth.

24. The sundial of claim 23 further comprising pivot means provided in said support bracket means and said connecting plate means for vertically pivoting said dials in concert with respect to said base means.

25. The sundial of claim 24 wherein the supporting surface is the earth and said base means fixedly engages said support bracket means and the earth.

* * * * *